(12) United States Patent
Ki

(10) Patent No.: US 12,465,011 B2
(45) Date of Patent: Nov. 11, 2025

(54) STAINLESS STEEL ANIMAL WASTE RECEPTACLE, METHOD AND SEQUENCE OF MANUFACTURING STEPS

(71) Applicant: Jacklyn Ki, Los Angeles, CA (US)

(72) Inventor: Jacklyn Ki, Los Angeles, CA (US)

( * ) Notice: Subject to any disclaimer, the term of this patent is extended or adjusted under 35 U.S.C. 154(b) by 0 days.

(21) Appl. No.: 18/623,993

(22) Filed: Apr. 1, 2024

(65) Prior Publication Data

US 2025/0143250 A1    May 8, 2025

Related U.S. Application Data

(63) Continuation-in-part of application No. 17/515,905, filed on Nov. 1, 2021.

(51) Int. Cl.
*A01K 1/01* (2006.01)
*B23C 3/13* (2006.01)
*B23K 26/38* (2014.01)

(52) U.S. Cl.
CPC .............. *A01K 1/0107* (2013.01); *B23C 3/13* (2013.01); *B23K 26/38* (2013.01)

(58) Field of Classification Search
CPC ......... A01K 1/0107; B23C 3/13; B23K 26/38
See application file for complete search history.

*Primary Examiner* — Moshe Wilensky
(74) *Attorney, Agent, or Firm* — Sam Pierce

(57) ABSTRACT

A method of manufacturing a stainless steel animal waste and cat waste receptacle comprising: fully laser cutting through the outlines of the vertical wall from at least 1.2 mm gauge 300 Series Austenitic stainless steel plate; fully laser cutting through the outline of the round bottom; partially laser cutting through the outlines of the U-shape entryway; rolling the vertical wall cutout into a cylinder form; rolling the edge of the round bottom to create a round circumferential edge between the vertical wall and round bottom; longitudinal-seam welding the seam of the cylinder vertical wall to join the opposite vertical edge of the cylinder form; circumference-seam welding the round bottom to the cylinder vertical wall to attach the round bottom to the cylindrical vertical wall; milling the interior and exterior; removing the U-shaped entryway and handle openings; and deburring the edges of the top, U-shaped entryway and handle openings.

1 Claim, 4 Drawing Sheets

STAINLESS STEEL ANIMAL WASTE RECEPTACLE, METHOD AND SEQUENCE OF MANUFACTURING STEPS

BACKGROUND

The present application especially relates to an animal waste receptacle and materials, methods and sequence of manufacturing steps therefor. More particularly, the present invention relates to a marine and medical grade 300 Series Stainless Steel cat waste receptacle and a method and sequence of manufacturing steps for producing it.

Animal waste receptacles may be commonly used by indoor animals, such as cats, to collect the animal's urine and feces. In general, most animal waste receptacles are formed with a plastic material. Granular cat litter may be placed in the bottom of the waste receptacle. The granular cat litter may be used to absorb moisture and odor caused by the animal's bodily functions. Further, since cats like to use their paws in a backward sweeping motion to cover their feces, the granular cat litter may satisfy a cat's instinctive desire to hide their scent by allowing them to bury their waste.

Even with proper cleaning and disinfecting of an animal waste receptacle, it is generally recommended that animal waste receptacles be replaced with a new one once or twice a year. Plastic, non-stick and Teflon® coated cat waste receptacles may be easily scratched and damaged by the cat using the waste receptacle. Channels formed by these scratches may harbor odor and bacteria. Further, cat urine is highly acidic. These discarded cat waste receptacles end up in landfills and will not biodegrade to any significant degree.

Biologically cats turn in circular motions right before and right after the elimination, however, most cat waste receptacles are in rectangular shape which obstructs the cats from making full circular movements. The length in which a cat can turn is limited to the shorter side of the rectangular, and therefore, it would most biologically appropriate to provide a cat waste receptacle with a circular interior to allow cats to turn in circular motions without any obstruction.

Typically cats squat down when eliminating, however, many cats urinate as high as 25 inches. Existing cat waste receptacles do not offer such a high wall height that is formed as one unibody but instead are typically made in 2 parts with an extended wall and bottom tray, which causes the urine to leak between the seams of the extended wall part and bottom tray. Therefore, it would be desirable to provide a 300 Series Stainless Steel cat waste receptacle that has a high vertical wall taller than 20 inches for high-urinating, non-squatting cats and to prevent urine spill over the common shallow 6-8 inch cat waste receptacle wall.

However, when a steel object has a height or depth that is higher or deeper than 8 inches it cannot be molded or casted or deep drawn out because it is known in the art that stainless steel plate cannot stretch, deep-draw or dent deeper than 8 inches. Only less malleable and rigid 300 Series Stainless Steel plate can be rolled and welded to achieve a wall height that is higher or deeper than 8 inches and a wall stands up straight without deformation and has a large entryway opening for the animal, a top opening to pour granular cat litter and handle openings on the curvature of the animal waste receptacle. For example, tall 200 Series Stainless Steel trash bins have plastic interior or framing around them to avoid deformation. A common 200 Series Stainless Steel food tray is only 6-8 inches in height which is too shallow to fill a minimum 2 inch litter level most veterinarians recommend to allow animal to urinate or defecate and bury waste. A 6-8 inch wall height is ineffective to retain high urination against the wall. And 200 Series Stainless Steel with low nickel content is not corrosion resistant enough to hold corrosive cat urine. A common stainless steel food tray that is 6-8 inches tall could not be successfully used as an animal waste receptacle and cat waste receptacle.

To avoid having to use plastic and non-stick or Teflon® coating that is frequently used in animal waste receptacles, a finely milled brushed interior surface is also needed to reduce wet animal waste and granular cat litter sticking to the surface.

Thus, a cat waste receptacle and animal waste receptacle made from 300 Series Stainless Steel material is needed. A method and a sequence of manufacturing steps which could produce a suitable cat waste receptacle using this material, which has a number of challenges relating to workability, is also needed.

SUMMARY OF INVENTION

In accordance with one embodiment, an animal waste receptacle and cat waste receptacle is disclosed. The animal waste receptacle and cat waste receptacle has a floor. A curved sidewall extends up from around a perimeter of the floor forming a cylindrical animal waste receptacle with an open top area. The animal waste receptacle is seamless and creviceless. The animal waste receptacle is made without welding burn marks and is formed of at least 300 Series Stainless Steel. A rounded curved edge is formed at an intersection of the floor and curved sidewall, the rounded interior bottom edge is preventing a buildup of materials stored in the animal waste receptacle and cat waste receptacle. A "U" shaped opening is formed in the curved sidewall in a front area of the animal waste receptacle and cat waste receptacle and at least 6" above the floor. A fill embossed line is formed around animal waste receptacle. A pair of handle openings is formed on opposing sides of the curved sidewall.

According to another embodiment, there is provided a method of manufacturing a stainless steel animal waste receptacle comprising: fully laser cutting through the outlines of the vertical wall from at least 1.2 mm gauge 300 Series Austenitic stainless steel plate; fully laser cutting through the outline of the round bottom from at least 1.2 mm gauge 300 Series Austenitic stainless steel plate; partially laser cutting through the outlines of the U-shape entryway height no greater than ⅔ of the total vertical wall height and no wider than ⅒ of the circumference; rolling the vertical wall cutout into a cylinder form; rolling the edge of the round bottom to create a round circumferential edge between the vertical wall and round bottom; longitudinal-seam welding the seam of the cylinder vertical wall to join the opposite vertical edge of the cylinder form; circumference-seam welding the round bottom to the cylinder vertical wall to attach the round bottom to the cylindrical vertical wall; milling the interior and exterior with a vertical mill brush to create texture on the curved surface to increase nonstick and resistance against scratches; removing the U-shaped entryway and handle openings; and deburring the edges of the top, U-shaped entryway and handle openings.

DETAILED DESCRIPTION

The present disclosure relates to an improved waste receptacle and a manufacturing method therefor. The improved waste receptacle may be formed of rust proof material. The improved waste receptacle may be formed without seams and crevices to prevent crevice corrosion. The improved waste receptacle may be formed of 300 series stainless steel and thus will not absorb odors, grow bacteria, mold, leave stains, rust or build up residues like the plastic, rubber, and low-grade stainless-steel waste receptacles.

Figure 1:
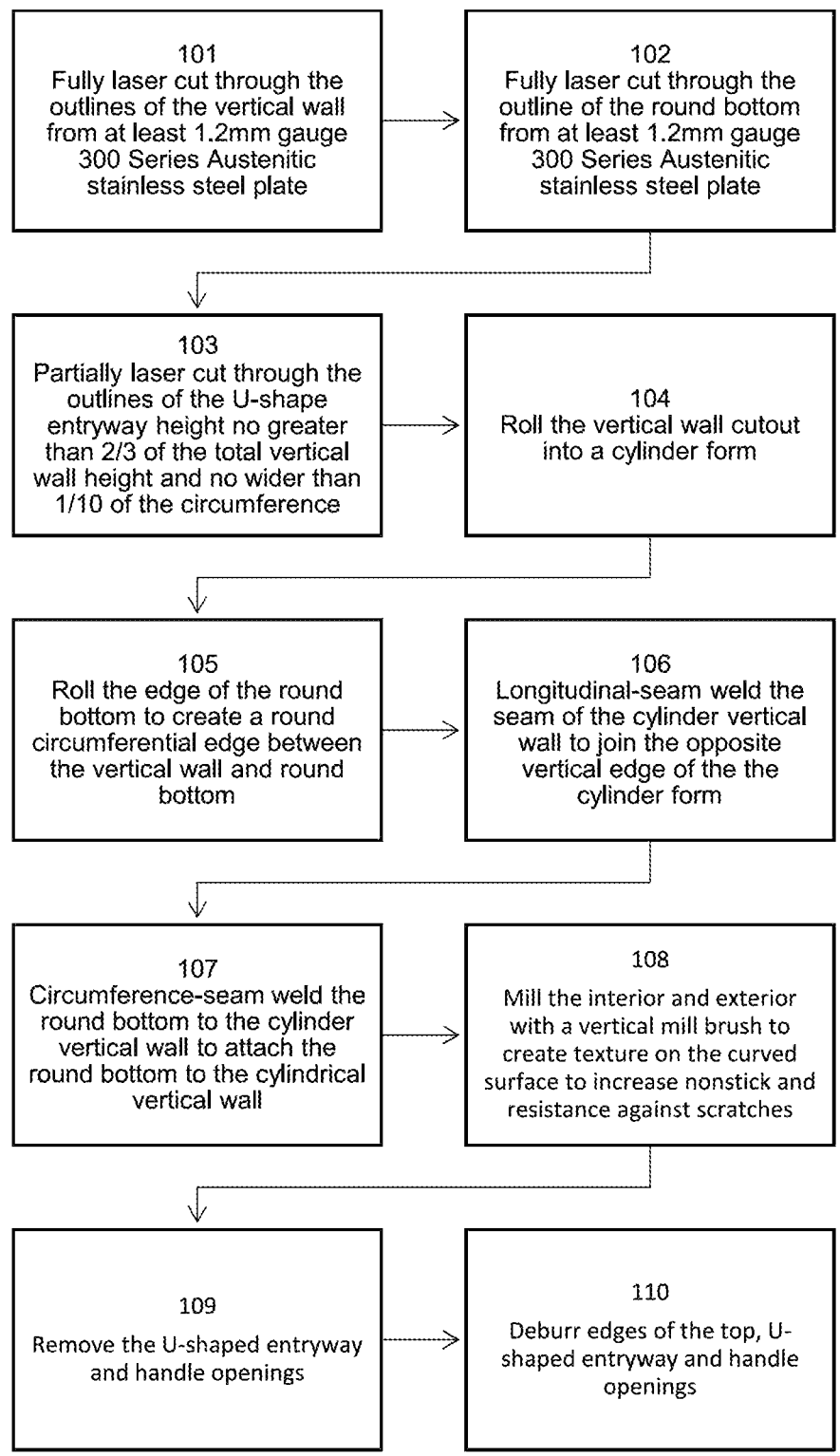
FIG. 1 is a flow diagram of a manufacturing process used to manufacture waste receptacles according to the present invention.

FIG. 1 is a flow diagram of a manufacturing process used to manufacture waste receptacles according to the present invention.

Step 101 is fully laser cut through the outlines of the vertical wall from at least 1.2 mm gauge 300 Series Austenitic stainless steel plate.

Step 102 is fully laser cut through the outline of the round bottom from at least 1.2 mm gauge 300 Series Austenitic stainless steel plate.

Step 103 is partially laser cutting through the outlines of the U-shape entryway height no less than ⅓ and no greater than ⅔ of the total vertical wall height and no wider than 1/10 of the circumference.

Step 104 is roll the vertical wall cutout into a cylinder form.

Step 105 is roll the edge of the round bottom to create a round circumferential edge between the vertical wall and round bottom.

Step 106 is longitudinal-seam weld the seam of the cylinder vertical wall To join the opposite vertical edge of the cylinder form.

Step 107 is circumference-weld seam the round bottom to the cylinder vertical wall to attach the round bottom to the cylindrical vertical wall.

Step 108 is mill the interior and exterior with a vertical mill brush to create texture on the curved surface to increase nonstick and resistance against scratches.

Step 109 is remove the U-shaped entryway and handle openings.

Step 110 is deburr edges of the top, U-shaped entryway and handle openings.

Figure 2:
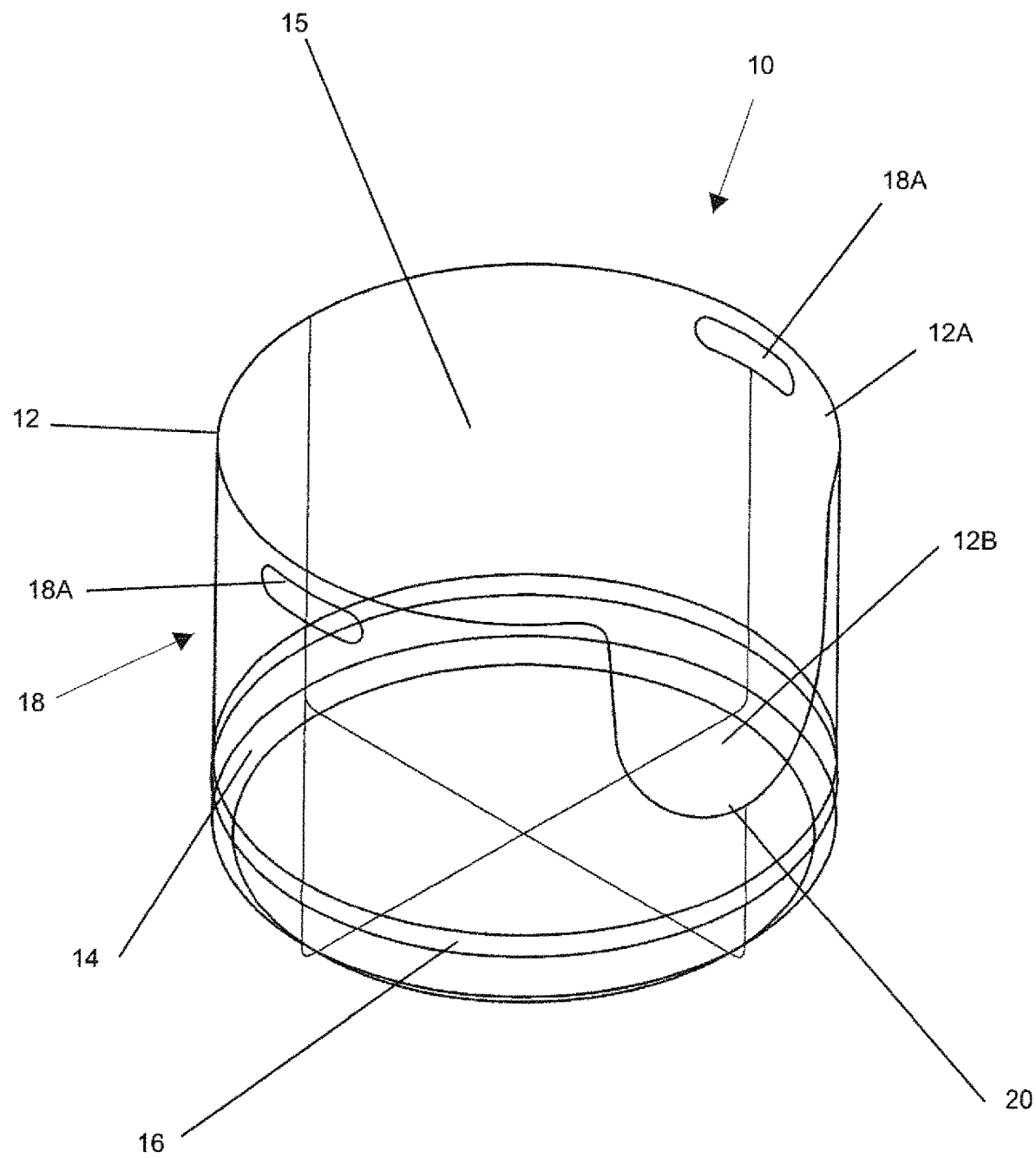
FIG. 2 is a perspective view of an exemplary embodiment of a waste receptacle in accordance with one aspect of the present application.
Figure 3:
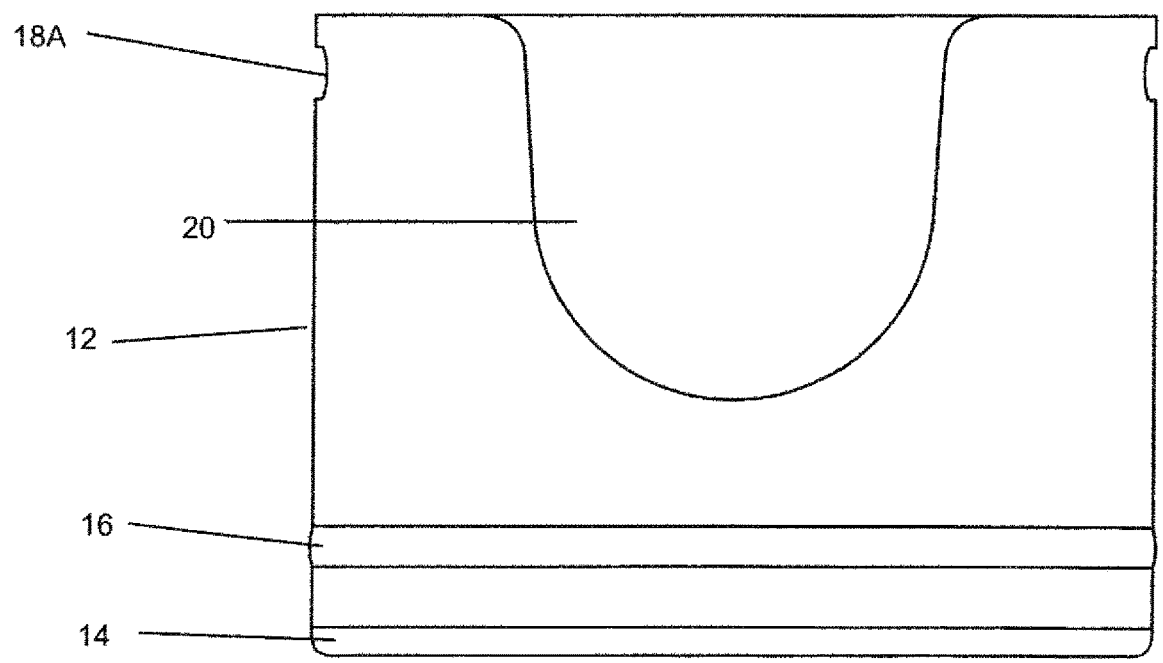
FIG. 3 is a front view of an exemplary embodiment of the waste receptacle of FIG. 2 in accordance with one aspect of the present application.
Figure 4:
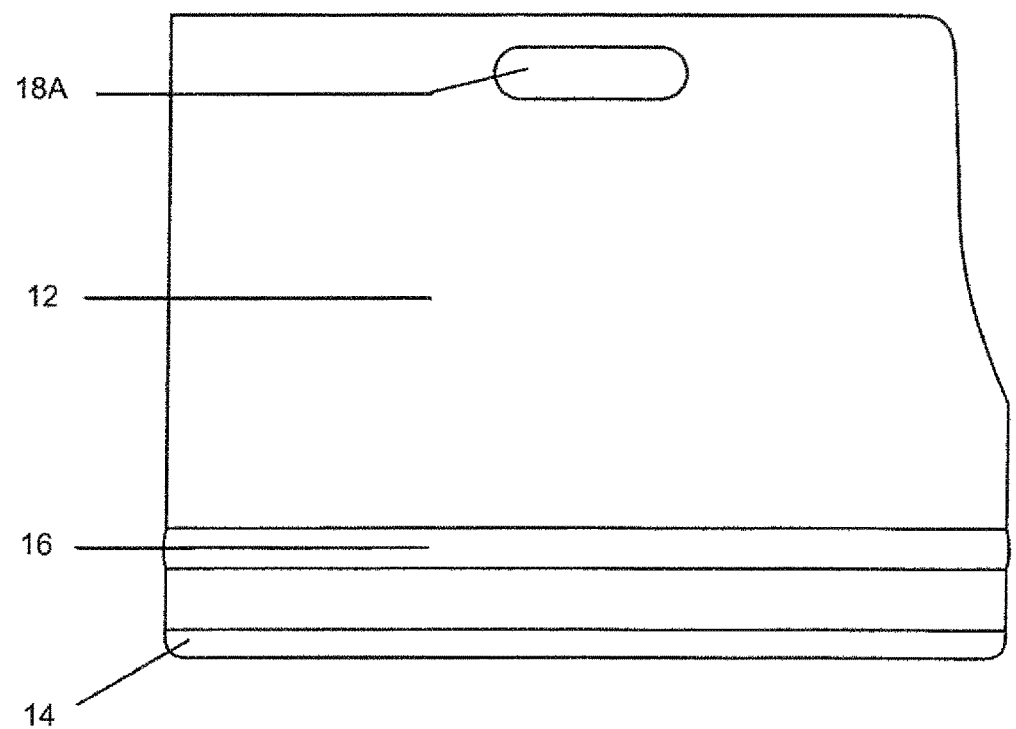
FIG. 4 is a side view of an exemplary embodiment of the waste receptacle of FIG. 2 in accordance with one aspect of the present application.

Referring to FIG. 2, FIG. 3, and FIG. 4, animal waste receptacle 10 may be seen. The animal waste receptacle 10 may be formed of a receptacle 12. The receptacle 12 may have an open top area 15 formed therein. In the present embodiment, the receptacle 12 may be circular in shape. The circular shape of the receptacle 12 may provide a receptacle 12 having no corners. Corners may present an issue in prior art waste receptacles. The corner areas are harder to clean and may be an area where the litter and animal waste collect. Thus, the circular shape of the receptacle 12 may be easier to clean and may prevent any build up or difficulty in removing the litter and animal waste from the receptacle 12.

In accordance with one embodiment, the receptacle 12 may be formed of a floor 12B. A side wall 12A may extend up from around a perimeter of the floor 12B forming the receptacle 12 with the open top area 15. The side wall is perpendicular to the floor and the outline of the top of the receptacle is parallel to the outline of the floor. The side wall is at least 1.2 mm gauge 300 Series Austenitic stainless steel plate and the floor is at least 1.2 mm gauge 300 Series Austenitic stainless steel plate.

Located in a bottom interior of the receptacle 12 may be a rounded/curved edge 14 (hereinafter rounded edge). The rounded edge 14 may be formed where the side wall 12A of the receptacle 12 meets with the floor 12B of the receptacle 12. The rounded edge 14 be easier to clean and may prevent any build up or difficulty in removing the litter and animal waste from the receptacle 12. Most prior art waste receptacles may use a receptacle having a sharper edge formed between the side wall of the receptacle and the floor. The sharper edge area is more difficult to clean and may be an area where the litter and animal waste collect.

A fill line 16 may be formed on the receptacle 12. In accordance with one embodiment, the fill line 16 may be formed on the side wall 12A. The fill line 16 may indicate an amount of granular cat litter that should be placed in the interior of the receptacle 12. The fill line 16 may be formed two to three inches above the floor 12B of the receptacle 12. In accordance with one embodiment, the fill line 16 may be embossed along a perimeter of the receptacle 12. The fill line 16 may be formed either along an exterior perimeter of the receptacle 12 or an interior perimeter of the receptacle 12. In accordance with one embodiment, the fill line 16 may be formed along an interior perimeter of the receptacle 12 to allow one to more easily see the fill line 16 when adding the granular cat litter to the receptacle 12. Embossing the fill line 16 may protect the fill line 16 from damage such as scratching from an animal and normal wear and tear thereby allowing the fill line 16 to last a longer period of time.

A pair of handles 18 may be fowled on opposing sides of the receptacle 12. The handles 18 may be used to pick-up and move the receptacle 12. In accordance with one embodiment, the handles 18 may be a pair of elongated oval openings 18A formed on opposing sides of the receptacle 12 such as a left side and a right side of the receptacle 12.

An opening 20 may be formed in a front area of the receptacle 12. The opening 20 may allow an animal to enter the interior of the receptacle 12. In accordance with one embodiment, the opening 20 may be a "U" shape opening. The bottom of the "U" shape opening 20 should be of sufficient height to keep the granular cat litter within the interior of the receptacle 12 but not be too high to prevent the animal from entering. In accordance with one embodiment, the bottom of the "U" shape opening 20 may be a minimum of four inches above the floor 12B of the receptacle 12. The outline of the U-shape entryway height is no greater than ⅔ of the total vertical wall height and no wider than 1/10 of the total circumference.

The letters pH stand for potential of hydrogen. A PH level is effectively a measure of the concentration of hydrogen ions (that is, protons) in a substance. Normal cat urine pH should be in the range of 6 to 6.5. However, various conditions and/or diet can either raise or lower urine pH in cats. A lower pH generally means that the cat urine is more acidic. A higher pH generally means that the cat urine is more alkaline. A major consideration is that abnormal urinary pH can promote the formation of crystals/stones that can irritate and/or obstruct the urinary tract of the cat. Further, more acidic urine may have a tendency to speed up the deterioration of prior art waste receptacles.

Many people may be under the assumption that all stainless steel is resistant to corrosion can easily be mold or casted from a machine, however, this is generally not true. Metal production generally require custom toolings and high manual skills. The lower the grade of the stainless steel, the higher the rate of corrosion that may occur. For example, many inexpensive stainless steel products you may find on Amazon® and Ikea® may be made of 201 or 200 series stainless steel. It may be hard to tell from the outside since all stainless steel may look the same. However, 200 series stainless steel eventually rust within 1-2 years even if they are not contacted with liquid but just sitting in a humid environment.

It has been shown, that certain solutions, may cause corrosion cracking in stainless steel. When passive metals such as the stainless steels corrode, the corrosion develops where passivity has been destroyed. This may occur at very small areas and result in a pitted surface. Once the passivity has been lost at a local spot, this area will be anodic to the remaining passive surface.

Increasing carbon content tends to increase susceptibility to sensitization. Holding the carbon content to a maximum of 0.03 percent, as found in higher 300 series of stainless steel, may be sufficient to avoid sensitization. Additions of titanium or columbium may also serve to inhibit the development of sensitization. Therefore, if the low carbon grades are not used, 300 series may be recommended for use in corrosive environments.

Thus, the present receptacle 12 may be formed of a seamless, crevice-free, rivet-free and austenitic 300 series of stainless steel. A receptacle formed of 300 series stainless steel will not absorb odors, grow bacteria, mold, leave stains, rust or build up residues like the plastic, rubber, and low-grade stainless steel waste receptacles currently available. In accordance with one embodiment, the receptacle 12 may be formed of 316 "marine" grade stainless steel.

Having a seamless, crevice-free, rivet-free receptacle 12 may be important as grain boundaries have less resistance to corrosion. Welding and drilling operations, for example, may leave an area near the welds and cuts in such a corrosion-susceptible or "sensitized" condition. The intergranular corrosion of a sensitized steel can be insidious, in that after such attack the steel sometimes appears relatively sound, but on more detailed examination may be found to possess very little strength.

Figure 5:
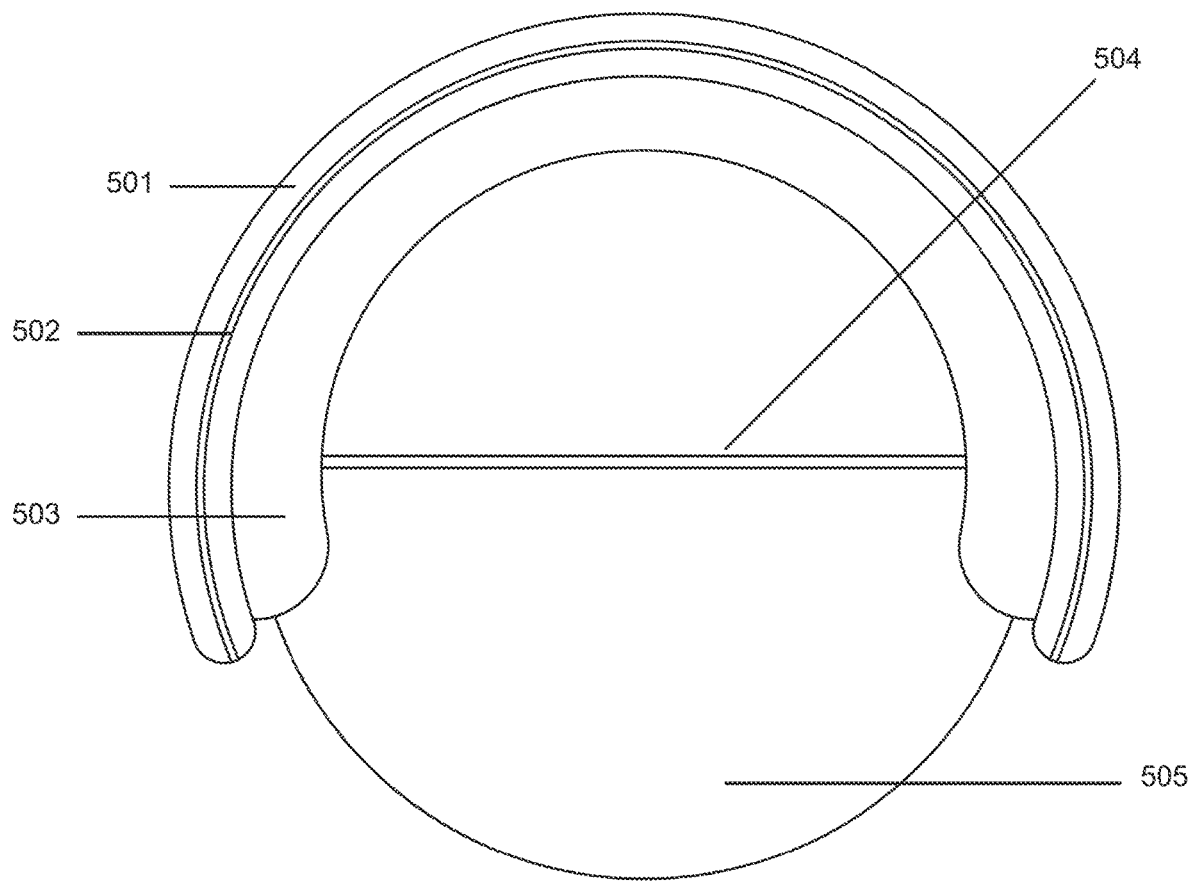
FIG. 5 is an illustration of a lid in an embodiment.

FIG. 5 illustrates a lid for the animal waste receptacle of the present invention.

The animal waste receptable of the present invention can be provided with a lid with a stainless steel center and malleable silicone rim which can conform to the shape of the present invention. A plastic or stainless steel lid would not easily conform to the shape, but a malleable silicone rim surrounding a stainless steel center will.

Folding hinge 504 provides a means to access the animal waste receptacle. Groove 502 clips around the top edge of the animal waste receptacle to secure the lid to the animal waste receptacle. 300 series stainless steel lid 505 connects to silicone platform 503 to support the 300 series stainless steel lid 505. Soft and malleable rim 501 is typically made of silicone.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description.

Other embodiments may be utilized and derived from the present invention, such that structural and logical substitutions and changes may be made without departing from the scope of this disclosure.

Figures are also merely representational and may not be drawn to scale. Certain proportions thereof may be exaggerated, while others may be minimized. Accordingly, the specification and drawings are to be regarded in an illustrative rather than a restrictive sense. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments.

Combinations of the above embodiments, and other embodiments not specifically described herein, will be apparent to those of skill in the art upon reviewing the above description. Therefore, it is intended that the disclosure not be limited to the particular embodiment(s) disclosed.

What is claimed is:

1. A method of manufacturing a stainless steel animal waste receptacle comprising:
    fully laser cutting through outlines of a vertical wall from at least 1.2 mm gauge 300 Series Austenitic stainless steel plate;
    fully laser cutting through an outline of a round bottom from at least 1.2 mm gauge 300 Series Austenitic stainless steel plate;
    partially laser cutting through outlines of a U-shape entryway height no less than ⅓ and no greater than ⅔ of vertical wall height and no wider than ¹⁄₁₀ of circumference;
    rolling a vertical wall cutout into a cylinder form;
    rolling the edge of the round bottom to create a round circumferential edge between the vertical wall and round bottom;
    longitudinal-seam welding a seam of a cylinder vertical wall to join an opposite vertical edge of a cylinder form;
    circumference-seam welding the round bottom to the cylinder vertical wall to attach the round bottom to the cylindrical vertical wall;
    milling the interior and exterior with a vertical mill brush to create texture on curved surface to increase resistance against scratches;
    creating handle openings;
    removing the U-shaped entryway and handle openings; and
    deburring the edges of the top, U-shaped entryway and handle openings.

* * * * *